L. FLEISCHMANN.
ALTERNATING CURRENT SYSTEM.
APPLICATION FILED APR. 29, 1913.
1,173,657.
Patented Feb. 29, 1916.
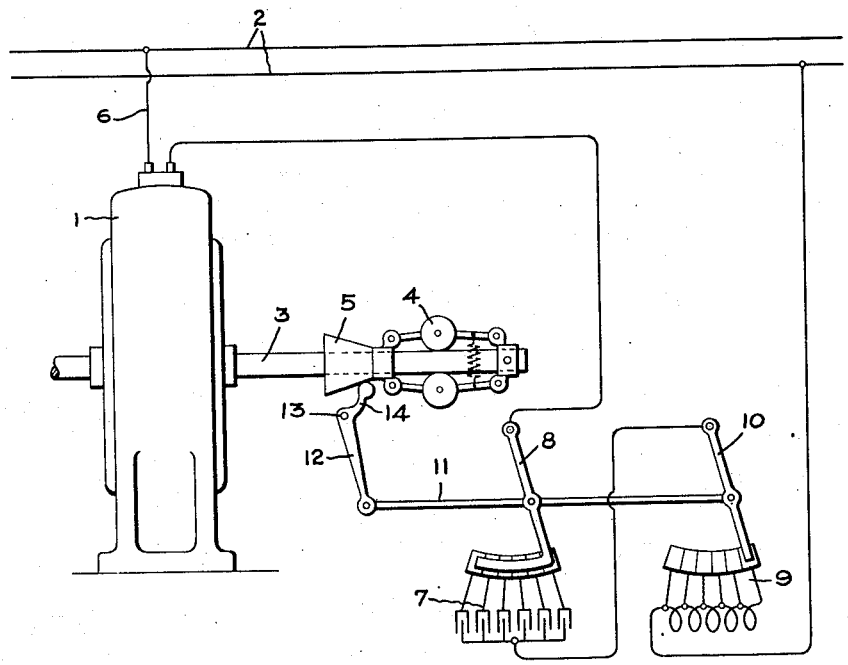
Witnesses:
Earl G. Klock.
J. Ellis Glen.
Inventor:
Lionel Fleischmann,
by Albert G. Davis
His Attorney.

UNITED STATES PATENT OFFICE.

LIONEL FLEISCHMANN, OF BERLIN, GERMANY, ASSIGNOR TO GENERAL ELECTRIC COMPANY, A CORPORATION OF NEW YORK.

ALTERNATING-CURRENT SYSTEM.

1,173,657.  Specification of Letters Patent.  Patented Feb. 29, 1916.

Application filed April 29, 1913. Serial No. 764,333.

*To all whom it may concern:*

Be it known that I, LIONEL FLEISCHMANN, a citizen of the United States, residing at Berlin, Germany, have invented certain new and useful Improvements in Alternating-Current Systems, of which the following is a specification.

My invention relates to alternating current systems, and in particular to systems in which a tuning device is employed for adjusting the impedance of the electric circuit.

More specifically, my invention relates to high frequency alternating current systems in which it is desirable to maintain the electric circuit tuned for resonance, or the impedance of the circuit substantially constant.

In high frequency alternating current systems it is frequently desirable, and often necessary, to tune the electric circuit for resonance in order to obtain a satisfactory and efficient output of the alternating current generator supplying current to the circuit. If the speed of the generator varies, the frequency of the alternating current similarly varies, and if the tuning device remains unaltered the circuit is no longer in resonance for this varied frequency and consequently the effective output of the generator is diminished.

The object of my invention is to provide means for automatically adjusting an electrical constant, or constants, of an electric circuit in response to changes in speed of the generator supplying current to the circuit.

More particularly the object of my invention is to automatically adjust a tuning device operatively related to an electric circuit, so that an electrical constant, or constants, of the tuning device may be varied as any desired function of the speed of the generator. In carrying out my invention I operatively connect a speed-responsive device to an alternating current generator and actuate thereby an adjustable tuning device operatively related to an electric circuit supplied with current from the generator.

The novel features which I believe to be patentably characteristic of my invention are definitely indicated in the claims appended hereto.

The details of construction and mode of operation of one embodiment of my invention will be understood by reference to the following description taken in connection with the accompanying drawing, in which the figure is a diagrammatic view of the novel features of my invention embodied in an alternating current system.

In the drawing I have illustrated an alternating current generator 1 supplying current to an electric circuit 2. On the rotor shaft 3 of the generator is arranged a speed-responsive device 4. In the drawing, I have shown, for the purpose of illustration, a centrifugal governor as the speed-responsive device, but it will be understood that any other equivalent device may be employed. A cam 5 is operatively secured to the movable end of the speed-responsive device and is arranged to slide longitudinally on the shaft 3.

One terminal of the generator is connected to one of the line conductors of the electric circuit through a conductor 6, while the other terminal of the generator is connected through a tuning device to the other line conductor. The tuning device shown in the drawing comprises a condenser 7 whose capacity is arranged to be adjusted by a movement of the arm 8, and an adjustable inductance 9 having a coöperating arm 10 for varying the amount of inductance included in the circuit. The arms 8 and 10 are pivoted to a connecting rod 11. The connecting rod is pivoted to one arm 12 of a lever, fulcrumed at a fixed point 13. The other arm 14 of the lever operatively engages with the surface of the cam 5 so that a longitudinal movement of the cam along the shaft 3 turns the lever about its fulcrum and actuates the connecting rod, thereby moving the arms 8 and 10, and thus adjusting the amounts of inductance and capacity operatively related to the electric circuit.

The operation of my novel system will be obvious from the foregoing description: If the speed of the rotor of the generator varies, the position of the cam 5 on the shaft 3 will be altered due to the action of the speed-responsive device. Such a movement of the cam will produce a corresponding and predetermined movement of the tuning device arms 8 and 10, and thus the tuning device is adjusted to correspond to changes in speed of the generator. Since in general there is no definite proportionality between the speed variation of the generator and the corresponding desired regulation or adjustment of the tuning device, it is necessary to determine the degree of regulation desired for a definite variation of speed. Any desired regulation can be given to the tuning device for a definite variation in speed by properly shaping the cam. The regulation or adjustment of the tuning device can thus be effected as any desired function of the speed of the generator.

I have illustrated in the drawing one embodiment of my invention in which the capacity of the condenser and the inductance are both decreased as the speed increases. It will be understood that this relation between the speed of the generator and the adjustment of the tuning device is merely for the purpose of illustration, and I do not desire to limit my invention to this particular relation, but I aim in the appended claims to cover any adjustment of the tuning device as a function of the speed of the generator.

While I have shown the tuning device connected in series in the electric circuit, it will be obvious that other arrangements may be employed; the essential feature being to arrange the tuning device in operative relation to the circuit. It will further be evident to those skilled in the art that under certain circumstances it may be unnecessary to employ both capacity and inductance in the tuning device, and I have accordingly employed the expression tuning device to cover a device having only capacity, or only inductance, or both.

What I claim as new and desire to secure by Letters Patent of the United States, is,—

1. The combination with a high frequency alternating current generator adapted to be driven at substantially constant speed, of a resonant electric circuit operatively related thereto, compensating means including an adjustable electric circuit tuning instrumentality for varying a suitable electrical constant of said circuit, and means responsive to the speed of said generator for automatically adjusting said compensating means to maintain said circuit in resonance regardless of any variations in the frequency of the alternating current supplied to the circuit by said generator resulting from fluctuations in the speed of the generator.

2. The combination with a high frequency alternating current generator adapted to be driven at substantially constant speed, of a resonant electric circuit associated therewith, adjustable inductance and adjustable capacity electrically associated with said circuit, and means responsive to the speed of said generator for automatically adjusting said inductance and said capacity to maintain said circuit in resonance regardless of any variations in the frequency of the alternating current supplied to the circuit by said generator resulting from fluctuations in the speed of the generator.

3. The combination with a high frequency alternating current generator adapted to be driven at substantially constant speed, of a resonant electric circuit associated therewith, compensating means including an adjustable electric circuit tuning instrumentality electrically associated with said circuit, and means for automatically adjusting said compensating means to maintain said circuit in resonance regardless of any variations in the frequency of the alternating current supplied to the circuit by said generator resulting from fluctuations in the speed of the generator.

In witness whereof, I have hereunto set my hand this 9th day of April, 1913.

LIONEL FLEISCHMANN.

Witnesses:
RICHARD NEUMANN,
GUSTAV WERNER.